Sept. 2 3,608,359

MASS MEASURING SYSTEM

Filed Nov. 12, 1969 6 Sheets-Sheet 1

INVENTOR
JOHN L. CHRISTMANN
BY
John A. Seifert
ATTORNEY

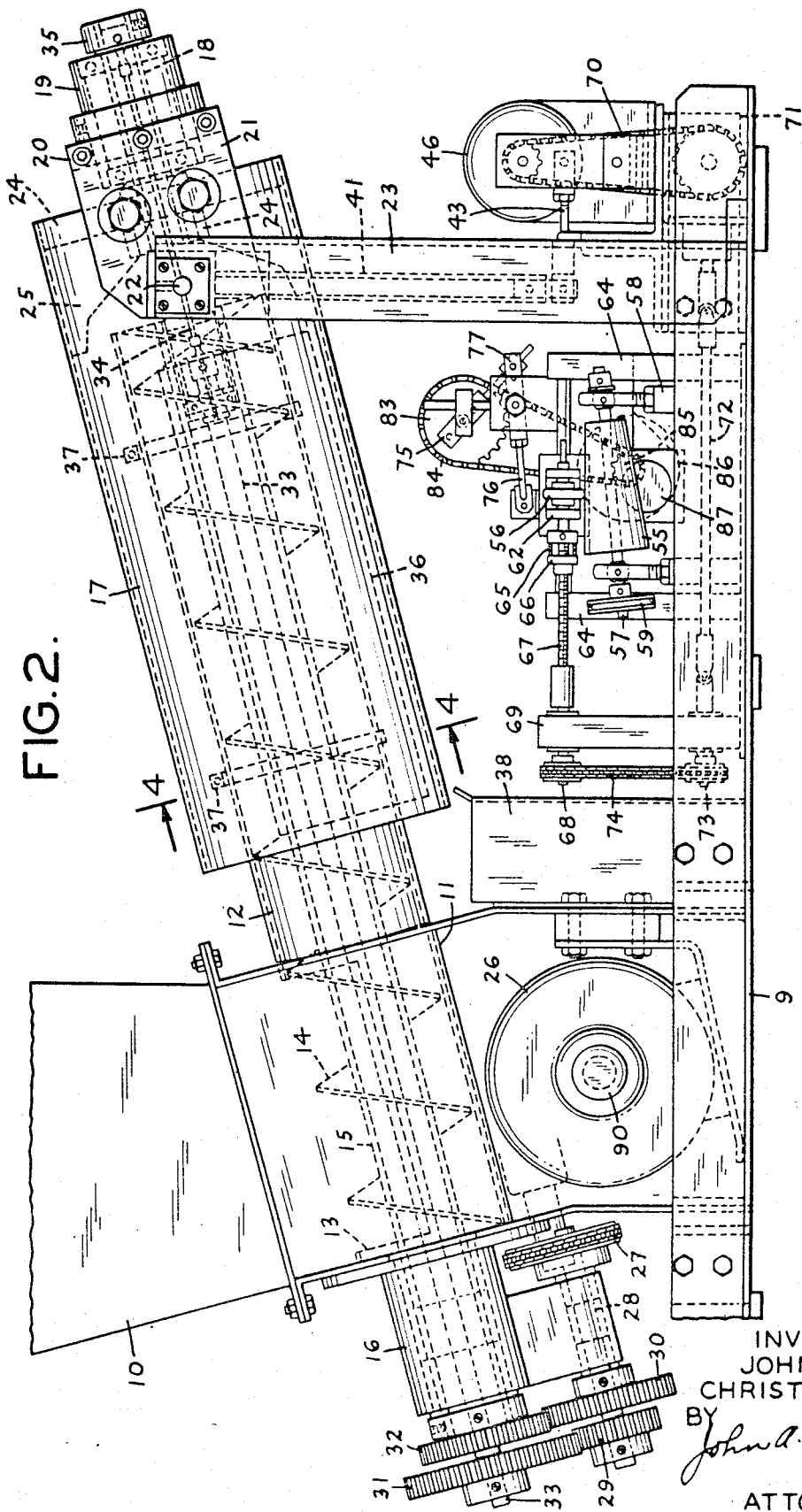

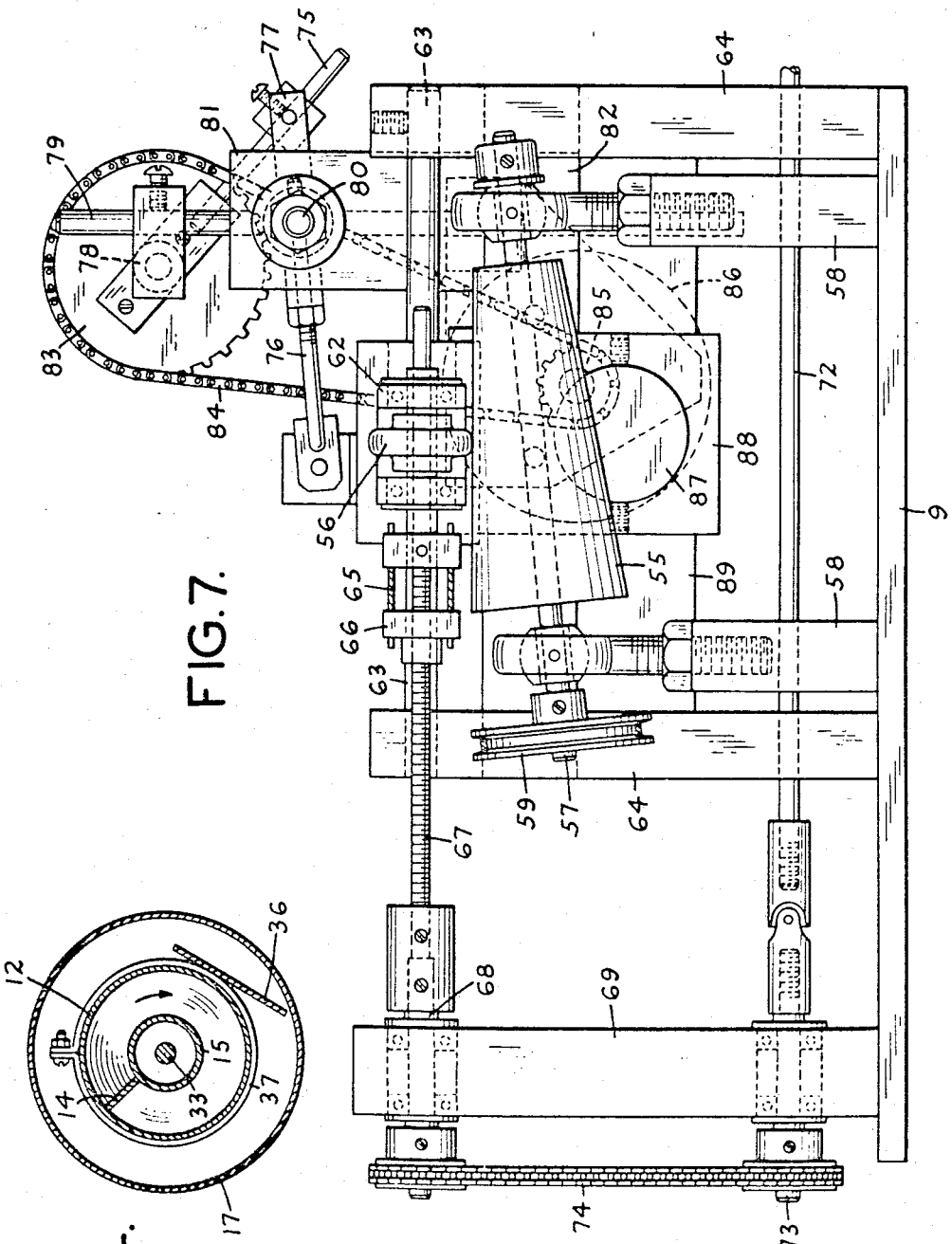

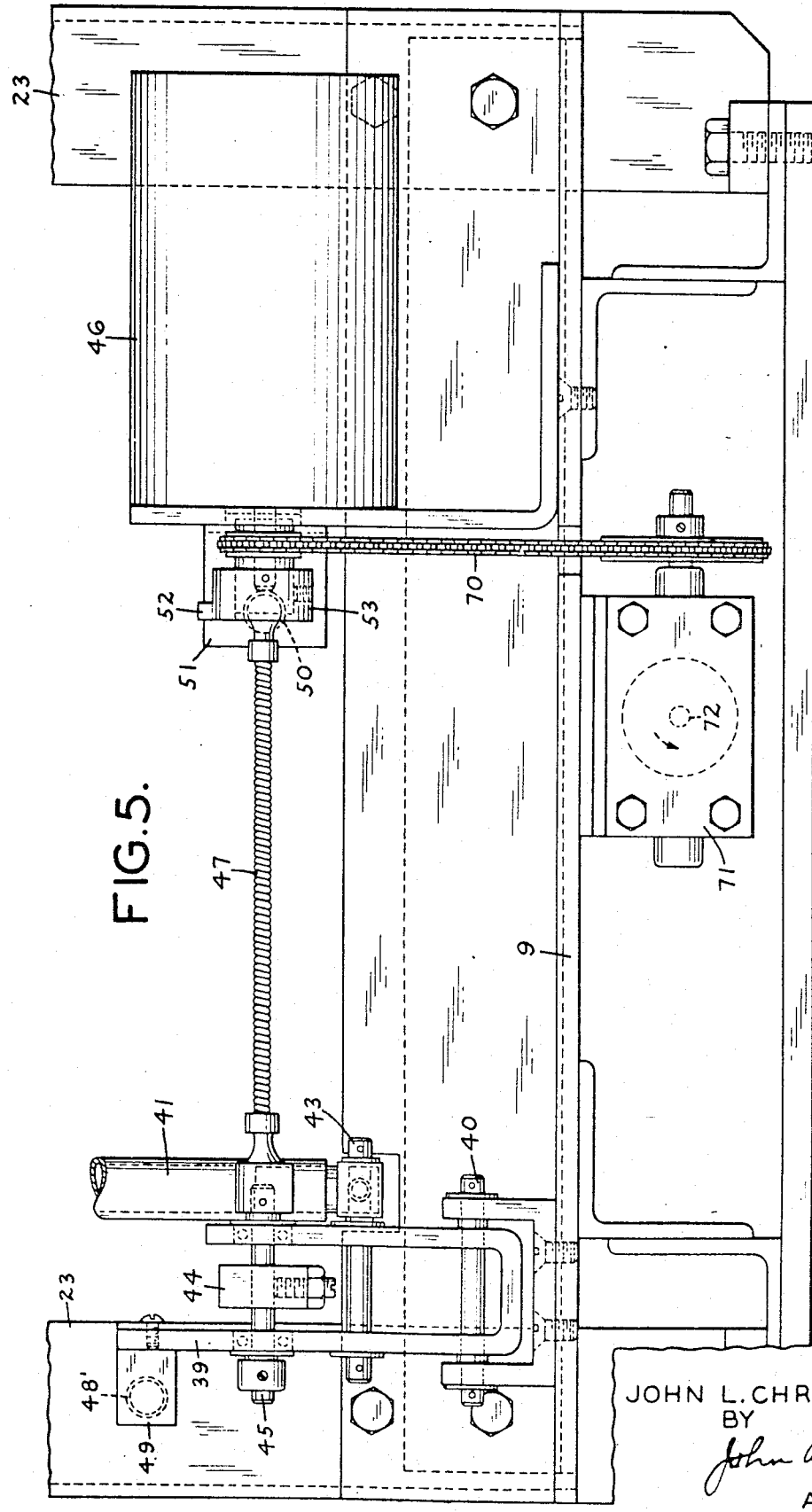

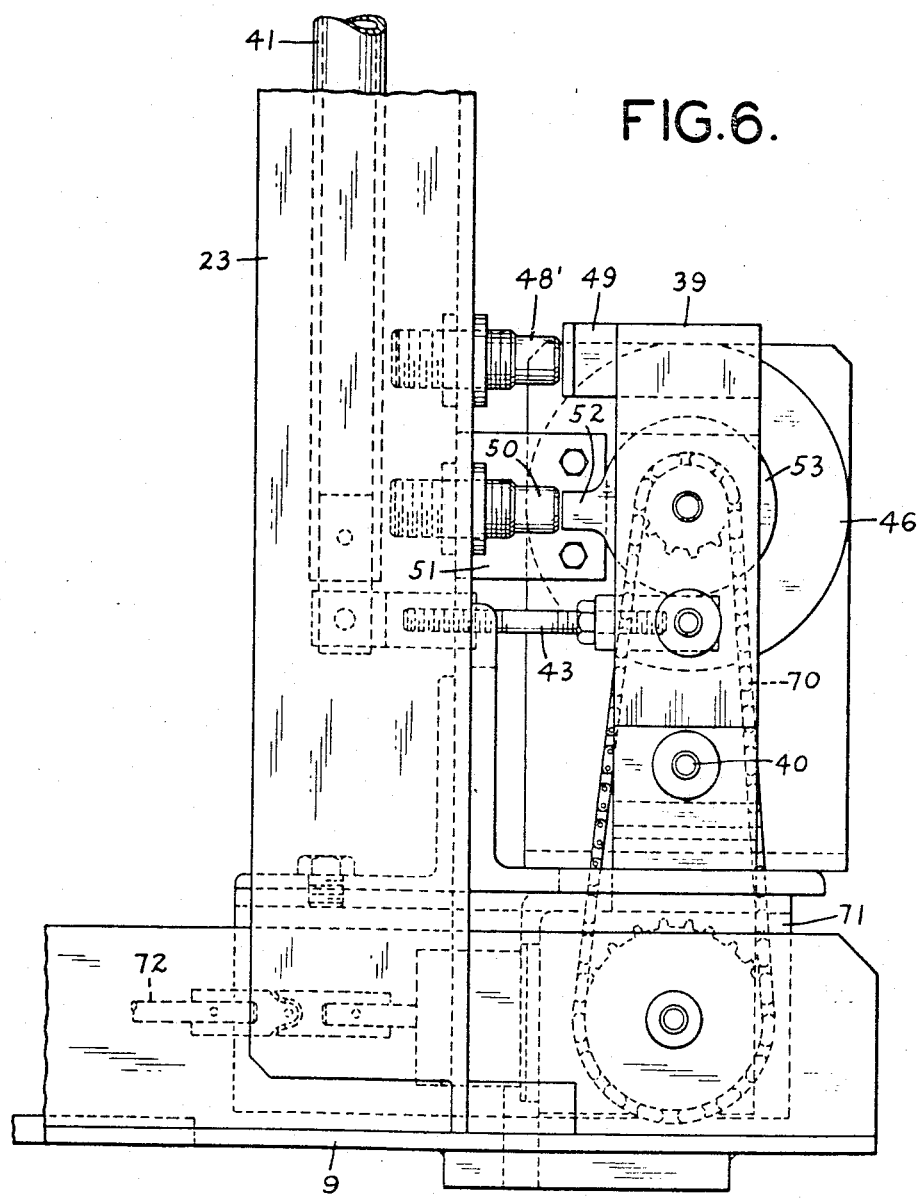

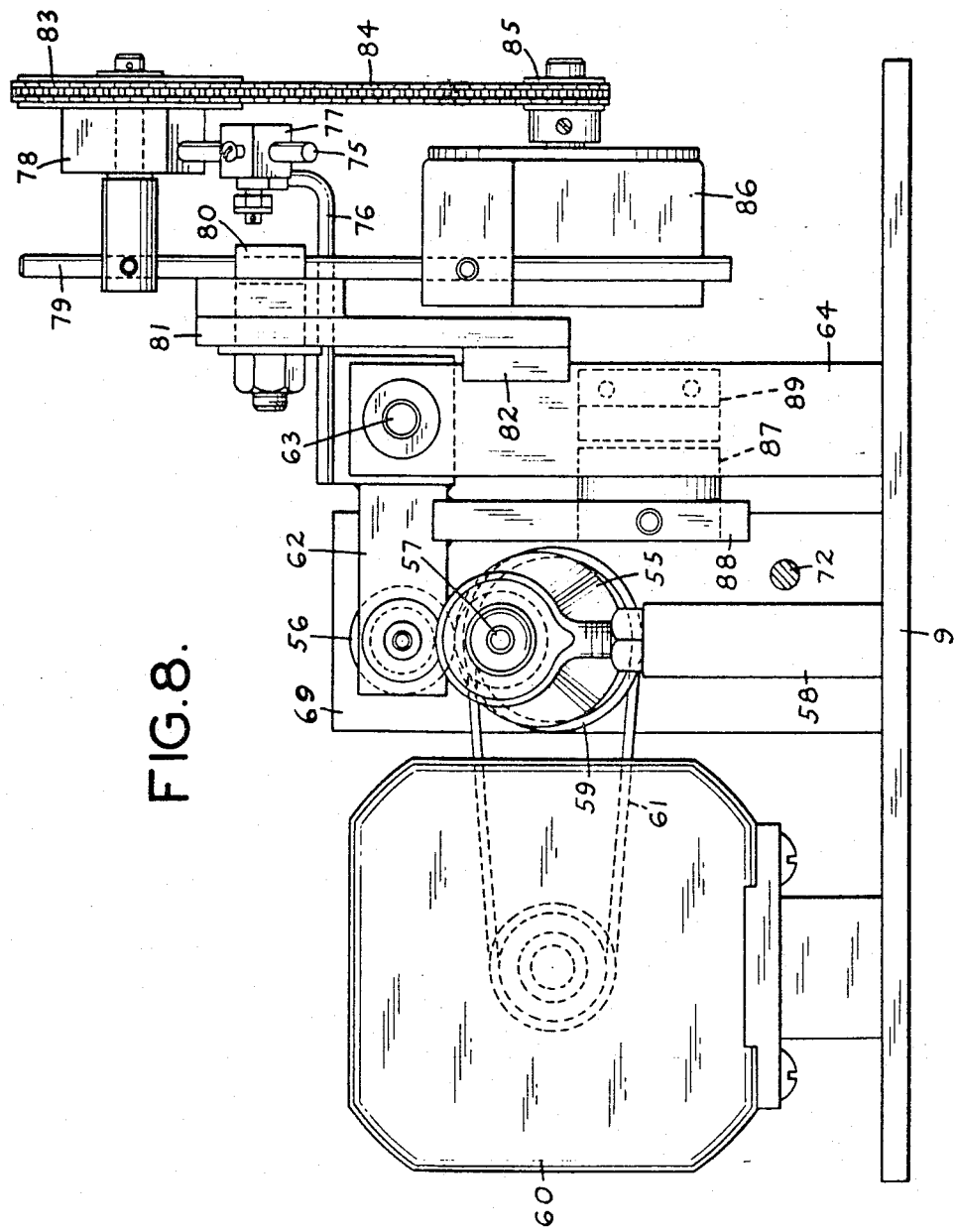

United States Patent Office 3,608,359
Patented Sept. 28, 1971

3,608,359
MASS MEASURING SYSTEM
John L. Christmann, Passaic, N.J., assignor to Merrick Scale Mfg. Company, Passaic, N.J.
Filed Nov. 12, 1969, Ser. No. 875,621
Int. Cl. G01g 11/04; G01h 13/00
U.S. Cl. 73—67.2
11 Claims

ABSTRACT OF THE DISCLOSURE

A continuously weighing conveyor is described in which a ninety degree phase angle lag is created between the resonant natural vibrating frequency of a conveyed material weight per foot called hereafter load and the frequency of a motor driven eccentric inducing the vibration and deviation of said phase angle from ninety degrees is detected by a phase sensitive network which automatically adjusts the motor speed for resonance. The speed of the motor is converted into a nonuniform linear motion and said nonuniform linear motion is transformed into rotary motion proportional to the load which actuates a potentiometer. The product of the load and the load conveyor speed representing the weight per time unit conveyed by the weighing conveyor is obtained by extending the voltage of a tachometer generator driven by the load conveyor across the potentiometer winding.

My Pat. No. 3,354,698, issued Nov. 28, 1967 and my patent application Ser. No. 723,834, filed Apr. 24, 1968, disclose mechanical and electromagnetic means for the excitation of a mass measuring system. In both the patent and patent application, the proper excitation depends chiefly on the amplitude of oscillation and low damping to achieve resonance. Since the amplitude varies also with differing mass, the correct resonant frequency is difficult to achieve.

In the present invention, the phase angle is used which at ninety degrees gives an unequivocal and accurate indication of resonance under all load conditions.

Linearization of the output in my patent and patent application was obtained by the frequency response directly, a procedure which is difficult. In the present invention, the frequency is not used but linearization is achieved mechanically after the transformation of the revolution of the motor into a straight line motion and adjustable to obtain accurate linearization.

The present invention comprises a torsional member vibrated with the load and the vibrations of said tonsional member are excited and sustained at their natural frequency by an eccentric rotatably supported by a pivoted frame and rotated by a SCR controlled direct current motor, said frame being connected to the torsional member. When the motor attains a speed equal to the natural frequency of the torsional member and the load system, resonance is achieved with maximum amplitude. The eccentric frame, torsional member and load system frequency will lag the motor driven eccentric frequency or speed by exactly a ninety degrees phase angle. Said phase angle is checked by vibration sensing means, such as induction coils, energized by the vibrations of the torsional member and the speed of rotation of the motor and eccentric and forming part of a phase sensitive network which automatically regulates the SCR speed controller of the motor until resonance is achieved. The rotation of the SCR speed controlled direct current motor is converted into a non-uniform linear motion by a cone driven by a constant speed motor and driving a disc mounted on a lead screw rotated by the SCR speed controlled direct current motor, so that variations in the speed of the SCR speed controlled direct current motor and the speed of rotation of the cone will move the disc along the cone and said movement is converted into a rotary motion proportional to the load. Said rotary motion turns a potentiometer which has its winding connected to the direct current voltage of a tachometer generator driven by a conveyor, conveying the load and constituting part of the load system, so that the product of the load and load conveyor speed is obtained.

In the drawings:

FIG. 2 is a side elevational view of the mechanical arrangement of the invention.

FIG. 4 is a sectional view taken on the line 4—4 of FIG. 2 looking in the direction of the arrows;

FIG. 5 is an elevational view, on an enlarged scale, of the lower part of FIG. 3 showing the connections between the torsional member and the eccentric, between the eccentric and the SCR speed controlled direct current motor, and between the SCR speed controlled direct current motor and the cone;

FIG. 6 is a side elevational view, on an enlarged scale, looking at the left hand side of FIG. 5 with the eccentric omitted;

FIG. 7 is a side elevation view, on an enlarged scale, of the cone, disc and potentiometer; and FIG. 8 is a view looking at the right hand side of FIG. 7.

Figure 1:
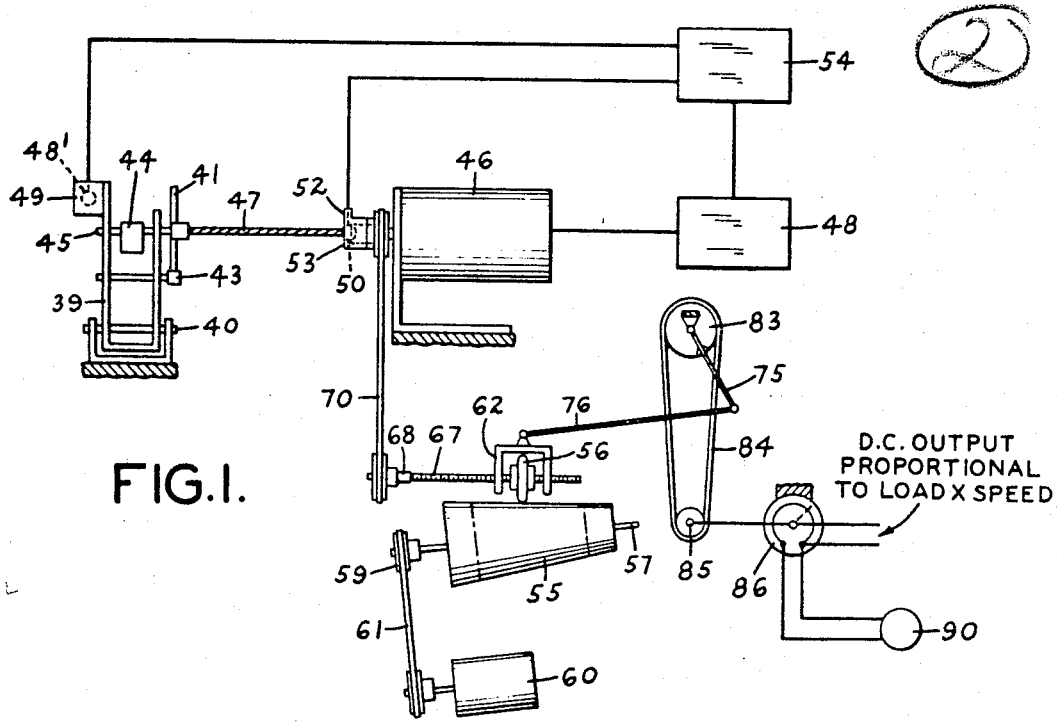
FIG. 1 is a diagrammatic view of the arrangement of components of the invention.

In carrying out the invention, there is provided a base 9 supporting a hopper 10 arranged with a circular discharge portion 11 extending at an acute angle to the base 9, as shown in FIG. 2. The hopper 10 delivers the material constituting the mass to be measured to a prefeeder tube 12 supported by the discharge portion 11 and having an opening 13 in the upper half thereof and within the discharge portion 11 to receive said material from the hopper 10. A screw conveyor is rotatably mounted within the tube 12 and comprises a helix 14 on a tubular shaft 15 rotatably supported in a bearing 16 on the discharge portion 11.

Figure 3:
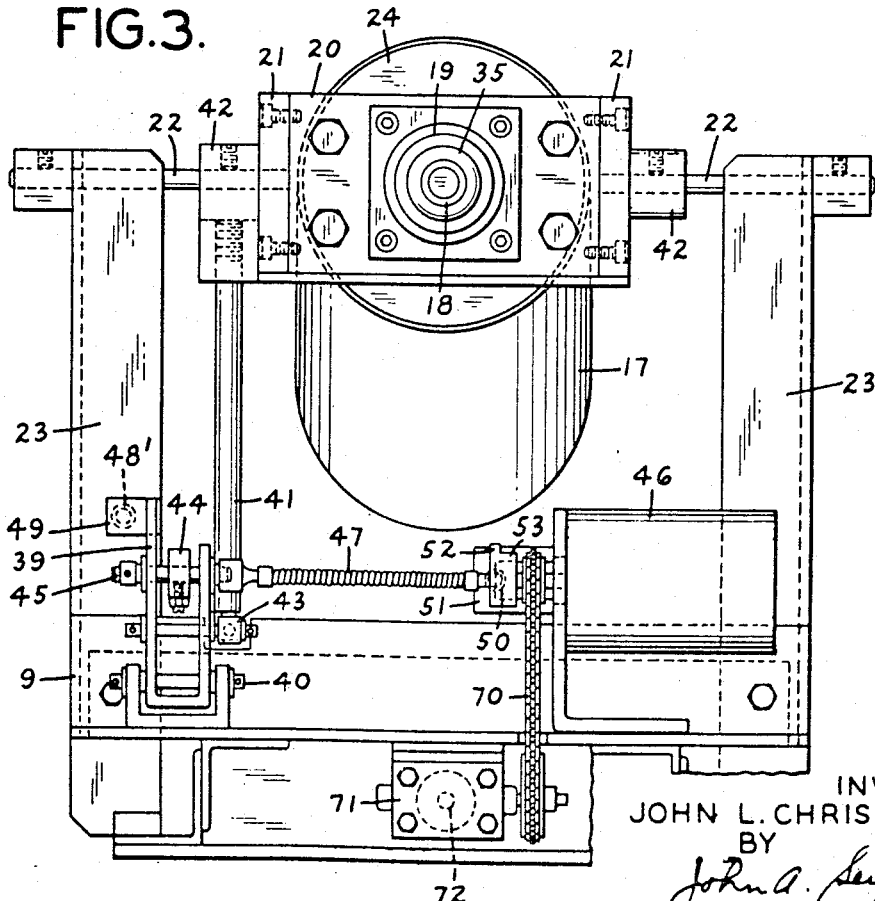
FIG. 3 is an end elevational view looking at the right hand side of FIG. 2.

The helix 14 will deliver the material to the upper end of a declining drum 17 encircling the tube 12 and supported on a hollow shaft 18 rotatably mounted in a tubular housing 19 in a base plate 20 attached to side plates 21 having hubs 42 fulcrumed on a torsional member in the form of two pins 22 fixedly supported in spaced standards 23, as shown in FIGS. 2 and 3. The upper end of the drum 17 is closed by a disc 24 secured to the hollow shaft 18 and provided with vanes 25 for dispersing material received from the tube 12 around the drum 17.

The helix 14 and the drum 17 are rotated at preselected speeds by a geared electric motor 26 with a tachometer generator 90 supported by the base 9 and operatively connected by a sprocket chain 27 to a shaft 28 provided with two gears 29 and 30 meshing with two gears 31 and 32, respectively. Gear 31 is secured on a shaft 33 extended through the bearing 16 and the tubular shaft 15 and connected to a flexible shaft 34 extended through the hollow shaft 18 and connected to a collar 35 secured to the end of the hollow shaft 18 projecting from the tubular housing 19, as shown in FIGS. 2 and 3. Gear 32 is secured on the tubular shaft 15. The speed of rotation of the helix 14 and the drum 17 are readily changed by changing the gears 29, 30, 31 and 32 with gears having different teeth ratios while maintaining the total number of teeth of each pair of gears constant.

To prevent material build-up in the drum 17, a scraper blade 36 is secured on split-rings 37 encircling and clamped to the prefeeder tube 12, as shown in FIGS. 2 and 4.

The material in the drum 17 will flow from the closed end to the lower open end into a chute 38 in the base 9, FIG. 2 to be discharged into a suitable depository, not shown.

The load in the drum 17 will vibrate with the pins 22 in a plane perpendicular to the axis of the pins and said vibration is excited and maintained by an eccentric assembly comprising a U-shaped frame 39 pivoted on a pin 40 supported by the base 9 and connected to a side plate 21 by an arm 41 connected at one end to the hub 42 of said side plate 21 and the opposite end of the arm 41 is pivotally connected to an intermediate portion of the frame 39 by a link 43, as shown in FIGS. 2, 3, 5 and 6. The plates 20 and 21 are retained against lateral movement on the pins 22 by the hubs 42, as shown in FIG. 3. The vibration of the pins 22 are sustained by rocking the frame 39 through an eccentric 44 fixed on a shaft 45 rotatably mounted in the upper portions of the frame 39. The eccentric 44 is continuously rotated by a direct current electric motor 46, supported by the base 9, through a flexible shaft 47. The speed of rotation of the motor 46 is controlled by a SCR speed controller 48, as shown in FIG. 1.

When the motor 46 automatically attains a speed equal to the natural frequency of vibration of the pins 22 and the load system, through a phase sensitive network 54, resonance is achieved with maximum amplitude. Then the frequency of vibration of the pins 22 and the load system will lag the frequency or speed of the motor 46 by exactly a ninety degree phase angle. If the phase angle is smaller than ninety degrees, the speed of the motor 46 is too low. The resonant frequency is a measure of the load conveyed as previously described. When both frequencies are unequal the controls adjust the speed of the direct current motor 46 and the frequency of the eccentric 44 automatically until both frequencies become equal. If the phase angle is larger than ninety degrees, the speed of the motor 46 is too high. The relative phase angle is checked by two induction coils, one coil 48′ being mounted on the standard 23 nearest the arm 41 relative to the path of movement of a tooth 49 projected laterally from an extended leg portion of the U-shaped frame 39, as shown in FIGS. 1, 3, 5 and 6. The other induction coil 50 is mounted on a plate 51 supported by the motor 46 relative to the path of travel of a tooth 52 extended from a collar 53 secured on the drive shaft of the motor 46 in axial alignment with the eccentric 44.

The induction coils 48′ and 50 are part of the phase sensitive network 54 in FIG. 1 and connected to the SCR speed controller 48 to adjust the speed of the motor 46 automatically until the ninety degree phase shift and resonance are restored, the highest frequency being at balance or no-load with the drum 17 empty of material and the lowest frequency at full load with the drum 17 loaded with the maximum weight of material to be conveyed.

In the present application, the conversion of the speed range or corresponding frequency range of the motor 46 to an analog signal is shown and described. The revolution of the motor 46 is converted into a linear motion by a cone 55 driving a disc 56, as shown in FIGS. 1, 2, 7 and 8. The cone 55 is secured on a shaft 57 extending at an oblique angle to position the surface contacting the disc 56 in a horizontal plane. The shaft 57 is rotatably supported by two posts 58 secured to the base 9 and provided with a pulley 59 driven at a constant speed by a synchronous electric motor 60 supported by the base 9 and connected to the pulley 59 by a belt 61, as shown in FIG. 8. The diameter of the cone 55 near the small end thereof is equal to the diameter of the disc 56.

The disc 56 is rotatably mounted in a bracket 62 slidably mounted on a rod 63 supported by standards 64 from the base 9, as shown in FIG. 8. The disc 56 is connected by a flexible coupling 65 to a nut 66 engaging a lead screw 67 connected to a shaft 68 rotatably supported in a standard 69 on the base 9. The shaft 68 is driven in synchronism with the motor 46 through a sprocket chain 70 connecting the motor 46 with a transmission 71 on the base 9 driving a shaft 72, FIGS. 5 and 6, coupled to a shaft 73 rotatably supported in the standard 69 and connected to the shaft 68 by a sprocket chain 74. If the lead screw 67 is driven at the same speed by the motor 46 as the speed of rotation of the cone 55, the disc 56 will remain in the same position. If the load in the drum 17 decreases towards balance or empty drum 17 and hence the speed of the motor 46 increases, the lead screw 67 will move the disc 56 towards the large end of the cone 55 until the speed of the cone 55 and the disc 56 at the point of contact are again equal. When the load increases, the speed of the motor 46 decreases and the cone 55 will drive the disc 56 toward the small end of the cone. The flexible coupling 65 avoids having the contact pressure between the disc 56 and the cone 55 transmitted through the nut 66 thereby increasing the friction and adversely influencing the positioning accuracy of the disc 56. A constant contact pressure between the cone 55 and the disc 56 is maintained by a permanent magnet 87 carried by an arm 88 suspended from the bracket 62, so that said magnet 97 will move along a flat 89 secured to the standards 64 without said magnet 87 contacting the flat, as shown in FIG. 8.

The motion of the bracket 62 has to be linearized since according to Pat. No. 3,354,698, the relationship between the frequency and the mass is established by the formula $$f = \frac{1}{2\pi} \sqrt{\frac{K}{\text{MASS}}}$$

where K is the spring constant or for the torsional vibration used in this invention by $$f = \frac{1}{2\pi} \sqrt{\frac{K}{J}}$$

where J is the mass moment of inertia.

The non-uniform linear motion of the disc 56 is transformed into a rotary motion proportional to the load in the drum 17. This is accomplished by connecting the bracket 62 to a crank 75 through a link 76 adjustably connected to the crank 75, as at 77. The crank 75 is secured to a hub 78 adjustably supported on a rod 79 mounted in a sleeve 80 adjustable about a horizontal axis in a bracket 81 secured to a cross-member 82 supported by the standards 64, as shown in FIG. 8. A sprocket wheel 83 is secured to the crank 75 and the hub 78 and is engaged by a sprocket chain 84 engaging a sprocket wheel 85 driving a potentiometer 86 adjustably mounted on the rod 79, as shown in FIG. 8. The non-uniform movements of the bracket 62 impart uniform angular movements of the shaft of the potentiometer 86. The adjustable connection 77, the adjustable supporting of the hub 78 and the sleeve 80 being adjustable about a horizontal axis will assure accurate linearization.

To obtain the weight (pounds per time unit in number of minutes) of material conveyed we have to form the product of load (weight of material in the drum 17 per number of feet) and the conveyor speed (feet per minute proportional to the drum revolutions per minute) by placing the direct current voltage of the tachometer generator 90 across the winding of the potentiometer 86 and taking the output between the contact of the potentiometer and one end of the winding of the potentiometer, as shown in FIG. 1.

Having thus described my invention I claim:

1. A mass measuring system comprising a load support, a torsional member supporting said support and adapted to be vibrated with the load on said support, first means connected to the torsional member and pivoted on a horizontal axis, a second means rotatably supported by the first means and arranged to impart a vibrating movement to said first means and excite and sustain the vibration of the torsional member, third means flexibly connected to the second means and arranged to rotate said means at a speed equal to the natural resonance frequency of the torsional member and the load on the load support, an electrical phase sensitive network including vibration sensing means energized by the vibrating movement of the first means and the rotation of the third means to check the phase angle between the vibration frequency of the first means and the vibration frequency of the second and third means, fourth means arranged to adjust the speed of rotation of the third means and actuated by the phase sensitive network to establish and maintain a ninety degree phase angle between the signals from the vibration sensing means, and fifth means actuated by the third means and arranged to convert the speed of rotation of the third means into a response proportional to the load.

2. A mass measuring system as claimed in claim 1, wherein the response proportional to the load is a linear motion, and sixth means actuated by the fifth means and arranged to transform the linear motion into rotary motion proportional to the load.

3. A mass measuring system as claimed in claim 2, wherein the load support comprises a conveyor, and seventh means actuated by the conveyor and connected to the sixth means to produce the product of the load and the conveyor speed.

4. A mass measuring system as claimed in claim 1, wherein the load support comprises a drum rotatably mounted and pivotally supported by the torsional member, a screw feeder rotatably mounted within the drum, and single motive means connected to the drum and the screw feeder to simultaneously rotate said drum and screw feeder.

5. A mass measuring system as claimed in claim 1, wherein the first means comprises a U-shaped frame pivotally mounted and connected to the torsional member, and the vibration sensing means comprises an induction coil positioned relative to the path of movement of said U-shaped frame.

6. A mass measuring system as claimed in claim 5, wherein the second means comprises an eccentric rotatably supported by the U-shaped frame.

7. A mass measuring system as claimed in claim 6, wherein the third means comprises an electric motor having a drive shaft, a flexible shaft connecting the motor drive shaft to the eccentric, and a projection of the motor drive shaft in axial alignment with the eccentric and traveling adjacent to another induction coil of the vibration sensing means of the electrical phase sensitive network.

8. A mass measuring system as claimed in claim 7, wherein the fourth means comprises a SCR speed controller electrically connected to the electrical phase sensitive network and the electric motor.

9. A mass measuring system as claimed in claim 2, wherein the fifth means comprises a cone, motive means rotating said cone at a constant speed, a disc adjustably mounted in contact with said cone and rotated by the third means, whereby the disc will be adjusted along the cone until the speed of rotation of the cone and the disc are equal.

10. A mass measuring system as claimed in claim 9, wherein the sixth means comprises a crank operatively connected to the disc and actuated by the movement of the disc along the cone, a sprocket rotated by the crank proportional to the load on the load support, and a potentiometer actuated by the sprocket.

11. A mass measuring system as claimed in claim 3, wherein the seventh means comprises a tachometer generator.

References Cited
UNITED STATES PATENTS

| | | | |
|---|---|---|---|
| 2,305,783 | 12/1942 | Heymann et al. | 73—67 |
| 2,694,310 | 11/1954 | Pounds | 73—67 |
| 3,354,698 | 11/1967 | Christmann | 73—67.2 |

RICHARD C. QUEISSER, Primary Examiner

J. P. BEAUCHAMP, Assistant Examiner

U.S. Cl. X.R.

177—1, 210